United States Patent [19]

Tsao

[11] Patent Number: 4,651,287

[45] Date of Patent: Mar. 17, 1987

[54] DIGITAL IMAGE PROCESSING ALGORITHM FOR OUTPUT DEVICES WITH DISCRETE HALFTONE GRAY SCALE CAPABILITY

[76] Inventor: Sherman H. Tsao, 2004 Biloxi Cir., Plano, Tex. 75075

[21] Appl. No.: 620,504

[22] Filed: Jun. 14, 1984

[51] Int. Cl.⁴ .................. G06F 15/66; H04N 1/00; H04N 1/387

[52] U.S. Cl. .................... 364/519; 358/75; 358/283; 358/284; 364/518; 364/520

[58] Field of Search ............ 364/518, 519, 520, 521, 364/523; 358/75, 80, 283, 284; 382/50, 52

[56] References Cited

U.S. PATENT DOCUMENTS

| | | | |
|---|---|---|---|
| 3,604,846 | 9/1971 | Behane et al. | 358/263 X |
| 4,051,536 | 9/1977 | Roetling | 358/283 X |
| 4,196,454 | 4/1980 | Warren | 358/283 |
| 4,246,614 | 1/1981 | Knox | 358/283 |
| 4,339,774 | 7/1982 | Temple | 358/283 |
| 4,419,690 | 12/1983 | Hammes | 358/75 |
| 4,447,830 | 5/1984 | Stoffel | 358/283 |
| 4,449,150 | 5/1984 | Kato | 358/283 |
| 4,486,788 | 12/1984 | Yamada | 358/75 X |
| 4,499,489 | 2/1985 | Gall et al. | 358/75 |
| 4,547,811 | 10/1985 | Ochi et al. | 358/283 X |
| 4,547,814 | 10/1985 | Hirosawa | 358/75 X |

Primary Examiner—Felix D. Gruber
Attorney, Agent, or Firm—Hubbard, Thurman, Turner & Tucker

[57] ABSTRACT

A method and apparatus relating to image reproduction by displays and printers capable of different dot size or different spot intensity generations. The reproduction is based upon scanned image data including gray scale values individually representing the image intensity at each picture element location (pixel). The display and printing devices generate either different size dots or spots of different intensities at each pixel location. The image processing algorithm assigns to each pixel location an appropriate printing or display dot size (or spot intensity as the case may be) to reproduce an image closely resembling the original. The resulting print dot selection represents both a good approximation of the original gray scale value at that pixel location, and an accurate gray scale reproduction of the image collectively. Additionally, this algorithm is suitable for image reproduction including line copy imagery, halftone and continuous tone pictorials.

25 Claims, 24 Drawing Figures

ASSIGNED DENSITY

| 1.0 | .95 | .65 | .40 |
|---|---|---|---|
| .95 | .70 | .45 | .20 |
| .75 | .55 | .30 | .15 |
| .60 | .35 | .25 | .20 |

FIG. 4b

PRINT DENSITY TABLE
d0 = 0
d1 = 0.30
d2 = 0.50
d3 = 0.80
d4 = 1.00

FIRST ITERATION

FIG. 4c — COMPUTED DENSITY

| 1.0 | 1.0 | .80 | .30 |
|---|---|---|---|
| 1.0 | .80 | .50 | .30 |
| .80 | .50 | .30 | 0 |
| .50 | .30 | .30 | .30 |

FIG. 4d — PIXEL ERROR

| 0 | -.05 | -.15 | .10 |
|---|---|---|---|
| -.05 | -.10 | -.05 | -.10 |
| -.05 | 0 | 0 | .15 |
| .10 | .05 | -.05 | -.10 |

FIG. 4e — 2×2 ERROR SUM

| 1st QUAD. -.20 | 2nd QUAD. -.20 |
|---|---|
| 3rd QUAD. .15 | 4th QUAD. 0 |

FIG. 4f — 4×4 ERROR SUM

-0.25

TO REDUCE 2×2 ERROR SUM

SECOND ITERATION

FIG. 4g — COMPUTED DENSITY

| 1.0 | 1.0 | (.50) | .30 |
|---|---|---|---|
| 1.0 | (.50) | .50 | .30 |
| .80 | .50 | .30 | 0 |
| (.50) | .30 | .30 | .30 |

FIG. 4h — PIXEL ERROR

| 0 | -.05 | (.15) | .10 |
|---|---|---|---|
| -.05 | (.20) | -.05 | -.10 |
| -.05 | 0 | 0 | .15 |
| (.10) | .05 | -.05 | -.10 |

FIG. 4i — 2×2 ERROR SUM

| (.10) | (.10) |
|---|---|
| .15 | 0 |

FIG. 4j — 4×4 ERROR SUM 0.35

TO REDUCE 4×4 ERROR SUM

THIRD ITERATION

FIG. 4k — COMPUTED DENSITY

| 1.0 | 1.0 | .50 | .30 |
|---|---|---|---|
| 1.0 | .50 | .50 | .30 |
| .80 | .50 | .30 | 0 |
| (.80) | .30 | .30 | .30 |

FIG. 4l — PIXEL ERROR

| 0 | -.05 | .15 | .10 |
|---|---|---|---|
| -.05 | .20 | -.05 | -.10 |
| -.05 | 0 | 0 | .15 |
| -.05 | (.20) | -.05 | -.10 |

FIG. 4m —

| .10 | 0 |
|---|---|
| (-.15) | .10 |

DIGITAL IMAGE PROCESSING ALGORITHM FOR OUTPUT DEVICES WITH DISCRETE HALFTONE GRAY SCALE CAPABILITY

BACKGROUND OF THE INVENTION

The quality of images reproduced over a television, a display panel, or by a printing system may be judged with respect to three characteristics: tone scale, image sharpness, and graininess. For digital type of image reproduction devices such as display panels, television monitors, and dot matrix printers there is a direct dependence of these characteristics on the reproduction device system parameters. The tone scale image quality depends on both the system tone reproduction curve which defines a gray scale transformation from the original to the reproduced image, and on the number of levels of gray the system is capable of reproducing. The sharpness factor is directly affected by the x and y resolutions of the reproduction device. Higher resolution devices are generally better at reproducing fine details, thereby yielding sharper images. Finally, graininess refers to those image noises which are usually process related and are not part of the original image.

There are three classes of images each of which has its own characteristics affecting the process of image reproduction. Line copy imagery is composed of typographic letters and symbols, lines, and solid filled areas of a single gray level. A continuous tone imagery is one which has an apparent continuum of gray levels as in photographs and natural scenes. Halftone imagery is an approximation by the printing press to reproduce the continuum of gray scale by varying the printed dot sizes prearranged in a geometric pattern. Variations in printed dot size yield a varying percent of light reflection from the printed image thereby creating the apparent gray scale illusion. Since line copy imagery is binary, consisting of only two levels of gray which is either black or white, its reproduction does not involve tone scale considerations. It does require the capability of reproducing fine details and smooth edges which is characteristic of the typographic fonts. Continuous tone imagery reproduction requires both fine detail as well as tone scale capabilities. Halftone imagery is basically binary, therefore its reproduction should be like that of the line copy imagery. However, its reproduction is complicated by the presence of a strong spatial frequency not contained in the original which may result in unwanted Moire patterns or other artifacts in the reproduced images.

Television has excellent tone scale reproducibility because it is capable of displaying many levels of gray. Coupled with adequate x and y resolutions, television is an excellent continuous tone reproduction device. On the other hand, modern displays and dot matrix printers are basically binary devices which display or print fixed size dots having no gray scale capability. With sufficient x and y resolution, these devices are good for reproducing line copy imagery and possibly halftone pictorials. The best method for achieving gray scale representation by the binary devices is through pseudo-halftone techniques which mimic the halftone process. However, this is done at the expense of the x and y resolution. As practiced in the graphic arts industry, halftone dots are created from 8 by 8 to 16 by 16 square matrix blocks of binary pixels, which give from 65 to 257 levels of gray. To attain the 100 to 120 lines per inch screen size printing, the original binary device must have resolutions of 800 to almost 2000 dots per inch. Modern dot matrix printers of the non-impact type have resolutions in the range from 200 to 480 dots per inch. They can produce near typographic quality letters and very good line copy imagery. However, pseudo-halftone techniques for gray scale reproduction drastically reduce their resolution to unacceptable levels. Any further increase in the resolution of these display and printing devices must be accompanied by drastic increases in the electronic memory and other component requirements, which make the cost prohibitive.

The role of image processing is to decide whether or not to display or print a fixed size dot at each pixel location such that the reconstructed image closely resembles the original. Stoffel and Moreland in their article "A Survey of Electronic Techniques for Pictorial Reproduction", *IEEE Transactions on Communications,* Vol. COM-29, No. 12, 1981, and Jarvis, Judice and Hinke in their article "A Survey of Techniques for the Display of Continuous Tone Pictures on Bilevel Displays", *Computer Graphics and Image Processing,* Vol. 5, 1976 discuss in detail the subject. For line copy imagery reproduction, simple thresholding can yield excellent results. For continuous tone imagery, the recreation of gray scale tone levels are either by means of halftone methods or dispersed halftone methods. For the reproduction of halftone originals, the reproduction algorithm must avoid introducing its own spatial frequency which may interfere with the strong spatial frequency associated with the halftone screen and cause Moire patterns.

In pseudo-halftone methods of gray scale generation, each halftone cell is composed of a number of individual print or display pixels clustered together. The most common form of the halftone cells is a N by N square pixel matrix of binary fixed sized dots. The general concept of the pseudo-halftone methods is to print or display a computed number of dots within a halftone cell achieving a gray scale value average approximating the averaged density value of the original. David Behane, Lewis Spradley, Lysle Cahill, and William Marshall in U.S. Pat. No. 3,604,846 disclosed a halftone method where the order of printing or displaying the dots is prescribed within the halftone cell by successively placing dots within the halftone cell connected together to imitate the formation of a single halftone dot. In contrast, James Berry, Anthony Hauser, Kurt Knuth, and Gary Ollendick in U.S. Pat. No. 3,977,007 disclosed a method of "dispersed" halftone process where the order of placing the dot is also predetermined but in such a way that successively placed dots are displaced from each other. Paul Roetling in U.S. Pat. No. 4,051,536 and R. W. Pryor, G. M. Cinque, and A. Rubinstein in their article "Bilevel Image Displays—A New Approach", *Proceeding of the S.I.D.,* Vol 19/3, 1978 both disclosed dispersed type of halftone methods where the choice of the dot placement location is made based on the local density information of the original within that halftone cell. While the pseudo-halftone methods very ably reproduce gray scale values for a halftone cell in the averaged sense, it suffers from a loss of resolution. Hence, small image details within each halftone cell are generally not well represented.

A second method is "Error Diffusion" where the decision to print or not to print a pixel is made based on the local scanned density information from the original as well as on the gray scale density errors committed by its already processed neighbors. Robert Floyd and Louis Steinberg in their article "An Adaptive Algorithm for Spatial Gray Scale", *Proceedings of the Society for Information Display*, Vol. 17/2 1976 and Stephen Temple in U.S. Pat. No. 4,339,774 both disclosed different implementations of the method. This method is capable of gray scale reproduction while providing local detail recreation. However, unless the error neighborhood taken into consideration for the computations is sufficiently large, the reproduced image tends to have a wormy appearance in smooth density areas. W. Thomas Warren in U.S. Pat. No. 4,196,454 disclosed a method of processing halftone image data which also diffuses the density error to the next halftone cell.

The pseudo-halftone methods generally can not be used to reproduce image originals which itself is halftone because of the strong tendency of producing Moire patterns in the recreation. Keith T. Knox in U.S. Pat. No. 4,246,614 disclosed a method of halftone processing with a built in shift control to align the reproduction halftone screen with that of the original image to avoid Moire patterning. On the other hand, error diffusion methods are generally suitable for halftone reproduction because they do not have a built in screen frequency in their processes.

All of the above mentioned digital image processing algorithms are for binary fixed size print dots or display spots. They all are able to reproduce well some of the image types: text and line drawing, continuous tone images, and halftone pictorials. The present generation of printers and displays poorly mimic the halftone technique of the printing industry because of insufficient dot resolution. It would be advantageous if the printers and displays could produce halftones as a natural part of their process.

Thus there is a need for an image processing algorithm which can generate gray scale in images without sacrificing image resolution. Also, there is the need for a single algorithm which is universally applicable to all types of imagery reproduction.

SUMMARY OF THE INVENTION

In accordance with the present invention an algorithm for processing image data is disclosed wherein the data represents picture elements to be printed or displayed, each picture element being programmable to one of a fixed number of gray scale values. The method (algorithm) includes the steps of: partitioning the image data into an array and computing a print array of print values where each print value is the closest gray scale value to a correspondingly located image datum of the image data array; then computing an error array of value differences between the print values and the correspondingly located image data values; and then adjusting the print values in accordance with the discrete gray scale values to reduce these sums of error values within a series of sets of uniquely sized error subarrays formed within the error array.

Also in accordance with the present invention an imagery production system is disclosed that includes an image data input apparatus for scanning an original image and producing an array of image input data corresponding to gray scale levels of picture element locations of the original image. A processing apparatus is provided to receive the image input array and for computing a print array of print values where each print value corresponds to one of a fixed number of gray scale values and the computed print array represents a minimum total difference between the image input array values and the possible print array values for the fixed number gray scale values. A printing apparatus capable of printing picture elements each having a dot size that corresponds to one of the fixed number of gray scale values is provided for printing several picture elements where each picture element corresponds to one value of the print array upon a medium wherein the pixel elements are printed at locations that correspond to the locations of the image data for printing a reproduction of the original image.

In a preferred embodiment of the method (algorithm) for processing image data, the image data, which represents picture elements of varying gray scale values, is partitioned into an image data array. In accordance with this method a print array is computed where each print value of the print array corresponds to each image datum of the image data array by being a value that is the closest, discrete gray scale value to the value of the image datum. An error array is then computed by computing the differences between the print values and the image data. The print values are then adjusted within the discrete gray scale values to reduce the error values by dividing the arrays into subarrays and reducing errors sums within the subarray and then successively forming larger subarrays and repeating the process. Specifically in adjusting the print values, the print value having the correspondingly located largest error of the same sign as the error sum within the error subarray is adjusted to the next discrete value of gray scale in order to reduce the overall error sum. This is accomplished for each subarray until no further adjustment will reduce the error sums for the subarrays. At that point the subarrays are repartitioned different subarrays where each of the new subarrays are larger than the preceding subarrays. The print value having the largest error of the same sign as the error sum is then again adjusted for each subarray in order to reduce the error sum for each subarray. This process continues until no further adjustment will reduce the subarray error sums. Again the data is repartitioned into large subarrays and this process continues until the data can no longer be partitioned, i.e the partition subarray is the array.

In a still further embodiment of the method, a method of processing image data is provided wherein the data includes a plurality of data points, each representing a gray scale value of an element area of an image document to be printed or displayed by a device printing or displaying pixels that correspond to these data points. Each of these pixels are programmable to one of several discrete gray scale values. The method includes the steps of partitioning the image data into a matrix having N columns and N rows where N is a power of the factor 2. A print matrix is then computed having print values where each print value is the closest pixel gray scale value corresponding to a similarly located image value of the image data matrix. An error matrix is then computed where the error values are the differences computed by subtracting correspondingly located print values from the similarly located images values. The error matrix is then partitioned into several submatrices of 2M by 2M elements each where M is initially 1. Then for each submatrix an error sum is computed by adding the error values of the submatrix. The print values for the submatrix are then changed by changing the print value having the largest corresponding magnitude submatrix error value of the same sign as the error sum to the next discrete gray scale value that will reduce the magnitude of the submatrix error value sum. This new print value matrix is then used to compute a new submatrix error sum and if the sum is less than the previous sum, the adjusted print value remains. These steps are formed for each of the submatrices until the submatrix error sums can no longer be reduced. The error matrix is then repartitioned into a second plurality of submatrices of 2K by 2K elements where K now is equal to 2M. The previous steps concerning the reduction of the submatrix error sums are then repeated. This repartitioning and reduction of submatrix error sums are continued until the submatrix is the original matrix.

In a further embodiment of the image production system, an image production system is provided that includes an image data input apparatus for scanning an original image and providing an array of image input data corresponding to gray scale levels of picture element locations of the original image. A high resolution electronic digitizing camera is an example of such an apparatus that will scan an image and provide the image data array. The processor is connected to the image data input apparatus for receiving the image input data and computing a print array of print values where each print value corresponds to one of a fixed number of gray scale values. The print array computation is performed in accordance with the methods previously discussed to produce a print array having a minimum total difference between each print array value and the correspondingly located image input array value within the limitations of the fixed number of gray scale values available. A printing apparatus is connected to the processor for receiving the print array from the processor. The printer is capable of printing picture elements where each element has a dot size that corresponds to one of the fixed number of gray scale values. The printer prints these picture elements where each element corresponds to the values of the print array at locations that correspond to the locations of the image data from the original image.

In another embodiment of the image reproduction system, the printer is replaced by display which display picture elements each having an intensity that corresponds to the fixed number of gray scale values. An example of such a display means is a cathode ray tube configured for digital input to display pixel elements of differing intensity that correspond to a fixed number of intensity levels specified at the input.

BRIEF DESCRIPTION OF THE DRAWINGS

The novel features believed characteristic of the invention are set forth in the appended claims. The invention itself, however, as well as other features and advantages thereof will be best understood by reference to the detail description which follows, read in conjunction with the accompanying drawings, wherein:

FIG. 4a–4n constitutes a flow-chart illustrating the partitioning of the data into arrays and reduction of the error sums for the arrays.

DESCRIPTION OF THE PREFERRED EMBODIMENT

Currently available displays and dot matrix printers, while capable of bit mapped graphic output, operate only in binary mode with two gray levels. Many of these same displays and printers are also capable of limited halftone output, however this capability is seldom used. The energy input necessary for the production of each printed dot or displayed spot is generally prescribed as an electrical signal of a precisely defined time duration and of certain voltage level resulting in a desired amount of electrical current flow through the device. Variations of energy input can be affected by either changing the on time portion (duty cycle) of the signal pulse, or the voltage level of the signal, or the electrical current flow. These input energy variations, when exercised within reasonable bounds, result in corresponding variations in the printed dot size or the display spot intensity. As an example, for non-impact printers of the various types including but not limited to laser and LED electrophotography, electrostatic, magnetic, ion deposition, thermal and thermal transfer, any reduction of the duty cycle (the portion of the "on time" for printing the dot) from its maximum causes a corresponding decrease in the printed density (or an increase in intensity). It is immaterial whether this is the result of a reduction in printed dot size or a reduction in the printed density, the net effect is that some limited gray scale capability can be obtained. For displays that require fast periodic refreshing, gray scale effect can be created by displaying the spot either every cycle or only some of the cycles, which the human eye perceives as intensity variations. For non-impact printers such as drop on demand ink jet and electrostatic printers among others, printed dot size variations can also be caused by changes in the amplitude of the applied voltage signal in the production of the dot. While physical limitations prevent continuous variations of the printed dot size or display spot intensity in the manner of the halftone dots, it is achievable as well as beneficial to have available a few discrete levels or printed dot sizes or display spot intensities to enhance the gray scale reproduction in images. This is the capability referred to in the title of this invention and, as follows, referred to as discrete halftone capability.

The application of the discrete halftone capability in image reproduction depends upon a new image processing algorithm using definitions as follows.

First, it is necessary to define a unit of measurement for the computations to be performed in the algorithm. There is no one unique choice for this. The decision made is based upon convenience and convention. Since the object of the algorithm is to achieve optimum gray scale reproduction, it is appropriate to use the output density as the unit of computations in the algorithm. Thereafter, the term density should be interpreted to mean output density unless otherwise specified. The discrete number of gray levels of the discrete halftone capability shall be referred to as "print densities" or "print values" and denoted by $d_0, d_1, d_2, \ldots d_n$, where $n+1$ is the actual number of levels available, and $d_0$ and $d_n$ refer to the white and black gray levels. Thus the object of the image processing algorithm is to decide for each pixel location, the print density value that results in an image that best approximates the original. Other choices for the units of measurement that are equally applicable are the per cent of dot area to be printed, or the output intensity levels.

In the following description of the image processing apparatus, a general algorithm will be described first; to be followed by a specific description fo the algorithm described in conjunction with an illustrative example.

General Algorithm

1. Since the density range of the original image differs from that of the output device, it is necessary to define a specific tone reproduction curve. With it the scanned input data can be transformed into a set of output density values. These "assigned" density values do not have to be the same ones as the print density table; they may approximately represent these assigned density value by using values from the print density table.

2. The algorithm partitions the page of assigned density values, which is referred to as an array, into adjoining blocks (alternatively called subarrays or neighborhoods) for the purposes of computations to be perforemd for each block.

3. Next on a block basis, a corresponding set of computed density values is generated where the only allowable values are those from the print density table. The computation is done iteratively. For the initial iteration, the selection from the print density table is made on the basis of the assigned individual pixel density values. If an assigned density value of a pixel location equals one of the print density values, then it becomes that selected density. Otherwise the assigned density value must fall in between two print density table entries and either one may be selected. Generally, it is preferred to choose the one which is closer to the assigned density value. A mathematical description of the above is as follows: Let $d(i, j)$ And $c(i, j)$ denote the corresponding elements of the assigned density block and the computed density block respectively, let $d_n$, $n=0, 1, .. L$ denote the allowed print density values, and let $g_o=d_o$; $g_n=0.5(d_{n-1}+d_n)$ for $n=1,2, \ldots L$; $g_{L+1}=d_L$ $c(i, j)=d_n$, If $d(i, j)=d_n$; for $n=0,1 \ldots L$ $c(i, j)=d_n$, if $g_n>d(i, j)>g_{n+1}$; for $n=0,1, \ldots L$ $c(i, j)=d_n$ OR $d_{n-1}$, If $d(i, j)=g_n$; for $n=1,2 \ldots L$ 4. A block of error values are comuted, the error values being the difference between the block of assigned density values and the corresponding computed density values. For example, if an element of the error block is negative, then the computed density value of that element is greater than the corresponding assigned density value. This is called over prescription. Similarly there is under prescription when an entry to the error block is positive, which corresponds to the case when the computed density value is less than the assigned one.

5. While there is definite limits as to how small the individual pixel error can be made, the total error for a cluster of pixels in a small block or neighborhood or subarray can be made smaller by choosing the individual pixel errors such that they cancel each other. This process is initiated by first partitioning the block into a number of smaller blocks. Each small block consists of two or more pixels. The error sum is computed for each small block. If the error sum is negative, there is net over prescription and an attempt will be made to reduce its magnitude. To do this, the pixel location with the most negative error term is located. The computed density value at this pixel location is changed to the next smaller print density value. This changes the local error at this pixel to a positive magnitude. Otherwise, the initial prescription would have been made incorrectly. Next, the individual location errors as well as the error sum for the small block is recomputed. If the magnitude of the new error sum is equal to or greater than that of the previous one, the new prescription is rejected in favor of the old one and the iteration process is terminated. If the magnitude of the new error sum is less than that of the old, the new computed density value is accepted and all the error terms updated. The iteration process is repeated until such time when the magnitude of the error sum can not be reduced, wherein the iteration process terminates. A similar iterative procedure is used when the small block error sum is positive. In this case the pixel term with the largest positive error is changed to the next larger print density value. The iteration process continues until the magnitude of the error sum can no longer be reduced. This computation is done for all the small blocks of the array.

6. The next step of the iteration is to form larger sized adjoining blocks or neighborhoods from the smaller ones and to reduce the magnitude of the error sums over each of the larger neighborhoods. This is done in an analogous manner as in the previous step except that the procedure must step through successively from the larger neighborhoods to the smaller ones and then to individual pixel locations. For example, if the error sum for the larger neighborhood is negative because of over prescription, correction must begin with that small neighborhood having the largest negative error sum. Within that smaller neighborhood the pixel with the largest negative error value is reassigned the next smaller print density value. If the reassignment results in a small magnitude of the error sum for the larger neighborhood, then it is accepted and all error tables recomputed. This iteration is repeated to further attempt to reduce the magnitude of the error sum for the larger neighborhood. The iteration is terminated when any reassignment does not reduce the magnitude of the error sum. The process is similar for a positive error sum resulting from under prescription.

7. The process of continuing to reduce the error sums over larger areas can be repeated until such time that the size of the neighborhood chosen is the block itself. At that stage and depending on the number of pixels contained in the block, the per cent error of gray scale reconstruction over the block would be very small.

It is obvious from the above that the algorithm procedure chooses the appropriate printed dot or display spot for each pixel location accounting for both the requirements for local detail reconstruction as well as for averaged gray scale reproduction over successively larger and larger areas.

Figure 1A:
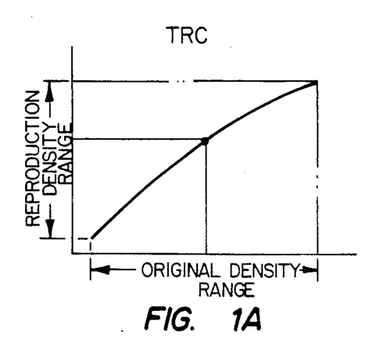
FIG. 1a is a graph illustrating a tone reproduction curve.
Figure 1B:
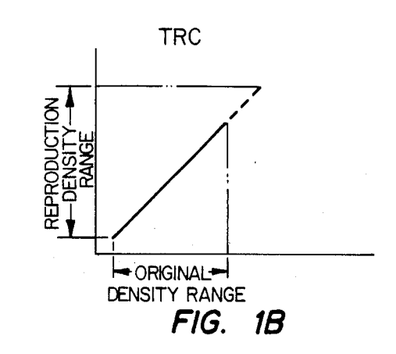
FIG. 1b is a graph illustrating a tone reproduction curve where the reproduction density is larger than the original density of the image.

As to the first step of the image processing algorithm that is to compute the desired output image density from that of the input scan data; the computation is necessary because the two density ranges do not necessary match and generally the output density range is smaller than that of the original image. For such cases J. A. C. Yule in "The Optimum Tone Rendering In Halftone Reproduction Processes", *Advances in Printing Science and Technology*, Vol. 3—*Halftone Printing*, W. H. Banks, Ed., Permagon Press, New York, N. Y. 1964, suggested a tone reproduction curve whose form is illustrated in FIG. 1a. For the reverse case where the output density range is the larger, then a linear tone reproduction curve representing exact tone scale reconstruction is preferred. FIG. 1b illustrates the latter case. After the choice of the appropriate tone reproduction curve is made, the page of scanned input data may be computed accordingly to yield a corresponding page of assigned output density values.

Figure 2A:
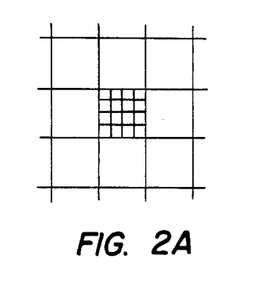
FIGS. 2a, b, and 2d illustrate partitioning of picture element cells into arrays (blocks).
Figure 2B:
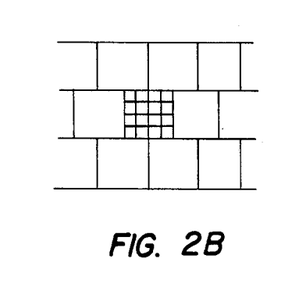
Figure 2C:
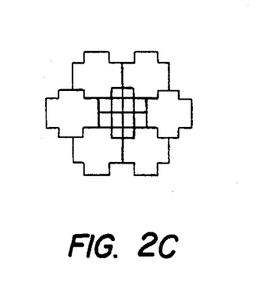
Figure 2D:
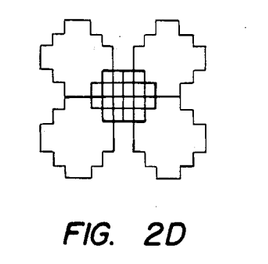
Figure 3A:
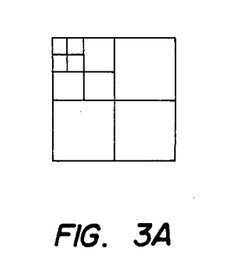
FIG. 3a illustrates a successive formation of different size subarrays (neighborhoods) from individual picture elements.
Figure 3B:
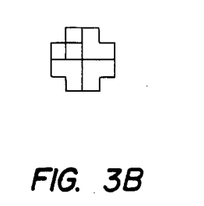
FIG. 3b illustrates the partitioning of an 8 picture element cross array into four 3 picture element neighborhoods.
Figure 3C:
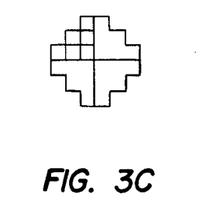
FIG. 3c illustrates a complex pattern array formation of picture elements.

The partition of a page of assigned density data into blocks can take many forms. FIGS. 2a, b, c and d illustrate some of the known methods of halftone cell formation as practiced by those in the art. FIGS. 3a, 3b and 3c illustrate the partitioning of the blocks into different size neighborhoods. FIG. 3a illustrates the successive formation of different size neighborhoods from the individual pixels. First there are the 2 by 2 cells, then the 4 by 4 cells, and finally the 8 by 8 cells which is the block itself. FIG. 3b illustrates the partitioning of the 8 pixel cross block into four 3 pixel neighborhoods. Finally, FIG. 3c illustrates for the complex patterned block, the formation from individual pixels, 2-pixel as well as 4-pixel neighborhoods which completely fill in the block.

Example

FIG. 4 illustrates by way of an example the algorithm using a 4 by 4 matrix block. It should be understood that the array size and form is dependent upon the image data and the following is only included as an explanation. For convenience, all density values of the image have been normalized between 0 and 1, 0 being white and 1 being black. On the same scale of density values, the print densities of the digital processor are $d_0=0$, $d_1=0.30$, $d_2=0.50$, $d_3=0.80$, and $d_4=1.0$. At start an instruction 30 is issued to generate a 4 by 4 assigned density value array (FIG. 4a) from the scanned input data according to a prescribed tone reproduction curve (logic function generator) such as illustrated in FIG. 1. This instruction represents the input to output density transformation including any desired tone enhancement adjustments. The result of the instruction is a 4 by 4 array of assigned density values which are stored in the memory of processor 20, (FIG. 5) and serves as the starting point. The remaining sequence is indicated by the directional arrows.

Then, an instruction 32 is issued to compare the assigned density arrray (FIG. 4a) with a print density table (Figure 4b) stored in memory and generate the computed density array (FIG. 4c). EAch entry of the array is a computed individually. If an entry of the assigned density array happens to be exactly one of the print density values, then this density value will be taken as the computed density value. This is the case of the assigned density value located at the row 1 and column 1 (1, 1) location of the array (FIG. 4a) which is the same as the print density value of $d_4=1.0$ (FIG. 4b). The corresponding computed density value at the same (1, 1) location therefore becomes the value of 1.0 (FIG. 4c) also. The assigned density value at array location (1, 3) (FIG. 4a) is 0.65, which falls between the two print density values of $d_2=0.50$ and $d_3=0.80$ (FIG. 4b). If the corresponding location in the computed density array (FIG. 4c) is given the value $d_3=0.80$, then it represents over prescription (over printing) with a density error equaling ($-0.15$). The other choice, $d_2=0.50$, results in under prescription (under printing) and a density error of 0.15. Generally, one would select the one with the smaller absolute error. In this case they are equivalent and hence either one may be selected; however, in the example the value $d_3=0.80$ is selected. Similarly, the other entries of the computed density array (FIG. 4c) are generated. Next, an instruction 34 is issued to compute an array of individual pixel density errors (FIG. 4d) from the algabraical difference between the assigned density array (FIG. 4a) and the computed density array (FIG. 4c). To complete the first iteration (FIG. 4c) instructions 36 and 38 are issued, respectively, to compute the 2 by 2 error sums (FIG. 4e) and to algebraically sum them to disclose for the array a $-0.25$ error for the array (FIG. 4f). Next, a second iteration is run to improve the printing quality. In this case, the clusters of 2 by 2 pixel locations form the small neighborhoods mentioned earlier in the description.

The objective of the second iteration (FIGS. 4g-4i) is to reduce the magnitudes of the 2 by 2 error sums to smaller values. Thus, an instruction 40 is issued to obtain the error sum for the first quadrant (FIG. 4e) which is ($-0.20$) and includes the individual errors 0, $-0.05$, $-0.05$, and $-0.10$ of the corresponding first quadrant of FIG. 4d. Then an instruction 42 is issued to determine the location of the largest error having the same sign as the error sum (FIG. 4d), and to exchange the computed density value of 0.80 for the next smaller print density table value of 0.50 (FIG. 4g) and instructions 44 and 46 are issued to algebraically subtract the new value 0.50 from the assigned density (FIG. 4a) and then recompute the value of the first quadrant. This exchange, while increasing the magnitude of the local density error from $-0.10$ (FIG. 4d) to 0.20 (FIG. 4h) reduces the magnitude of the 2 by 2 error sum to 0.10 (FIG. 4i). Subsequent trials exchanging other computed density values do not reduce the magnitude of the 2 by 2 error sum and, therefore, the computation is terminated for this first quadrant. Similar instructions are issued for each of the other quadrants. Whan a 2 by 2 error sum is positive, then any exchange of the individual computed density must be for the next higher print density value. This sequence of computations yields a new iterated computed density array, a new pixel error array, and a new 2 by 2 error sum array. Next, an instruction 48 is issued to algebraically sum up all the 2 by 2 error sums (FIG. 4i) to obtain the total error sum of 0.35 (FIG. 4j) for the 4 by 4 array.

Then, a third iteration is run to reduce the 4 by 4 error sum value of 0.35. Since it is positive, indicating on the average of under prescription, an instruction 50 is issued to determine the largest positive 2 by 2 error sum; this is found to be quadrant 3 which has a value of 0.15 (FIG. 4i). Then an instruction 52 is issued to determine the largest positive individual error within that 2 by 2 cluster; this error value is located at the (4, 1) location (FIG. 4h). Next, instructions 54 and 56 are issued to determine the original choice and the next higher value. Thus, an exchange is made from the original choice of 0.60 (FIG. 4a) to the next higher print density value of the print density table (FIG. 4b), i.e. 0.80 (FIG. 4k). Then an instruction 58 is issued to algebraically sum the new value 80 from the original density value 60 to form the new pixel error. This changes the individual pixel density error to $-0.20$ (FIG. 4l). Then an instruction 60 is issued to compute the 2 by 2 error sum which is $-0.15$ (FIG. 4m). To complete, an instruction 62 is issued to sum the quadrant error to determine the 4 by 4 error sum, which is 0.05 (FIG. 4n). The third iteration is then repeated to determine whether other exchanges will further reduce the 4 by 4 error sum and the procedure is terminated. The last obtained computed density array is the desired result for printing (which is also referred to as the print array). It will be appreciated that for negative errors, which indicate over prescription, the next lower print density value is used.

It is interesting to note that during the second iteration in reducing the first quadrant 2 by 2 error sum, the computed density at (2, 2) location is exchanged because it has the largest negative error value. After the exchange, the 2 by 2 error sum is changed from −0.20 to 0.10. Had the exchange been at the (1, 2) location with 0.80 substituted for 1.0 and the pixel error changed to 0.15, the 2 by 2 error sum would have been zero. This illustrates that while the algorithm leads to converging results, neither the detail procedure nor the result need be unique.

The invention also has application in computer graphics. Instead of generating the assigned density array from scanned input data, it could easily be generated by the computer, otherwise the algorithm remains the same.

Color printing is composed of the superposition of either three or four single color images printed on top of each other over the same medium. The primary colors chosen are cyan, magenta, yellow and often also black. Good color printing requires that each of the single color images must be sharp, having proper tone balance, and an absence of graininess. The present invention has applications to color printing through image processing of the single color images.

There is an adaptive method of calibrating the achievable density levels by utilizing the very machines which execute the image scanning and reproduction functions. The printer can easily incorporate a special test pattern signal generator which commands the printing of uniform areas of constant density at the prescribed energy levels. The density values for the discrete number of gray levels thus generated can be directly read by the scanner and the results recorded in the memory as the print density table for all subsequent image processing computations. This calibration operation is necessary in order to compensate for the frequent changes in the printer output density.

Finally, the present invention also applies to the degenerate case of the binary printer or display system. In this case, the print densities are either black or white. The computational procedure remains the same. Often in cases where the output device has sufficiently high x and y resolution, a special application of this invention can lead to a reproduced image of comparable quality with only one half the data storage requirements. At the 2 by 2 pixel level, only density which corresponds to the number of dots printed is important. The dot orientation has little effect upon the reproduced image. Furthermore, by choosing four out of the five possible density levels in a 2 by 2 pixel matrix and by preassigning the dot orientation for these four cases, each of the 2 by 2 pixel arrays may be considered a discrete halftone pixel capable of four density levels. The present invention may be applied to process the image at the 2 by 2 pixel level. Since each of the 2 by 2 pixel arrays in the present consideration require only two bits to represent instead of the original four bits, a 50% saving has been achieved.

Figure 5:
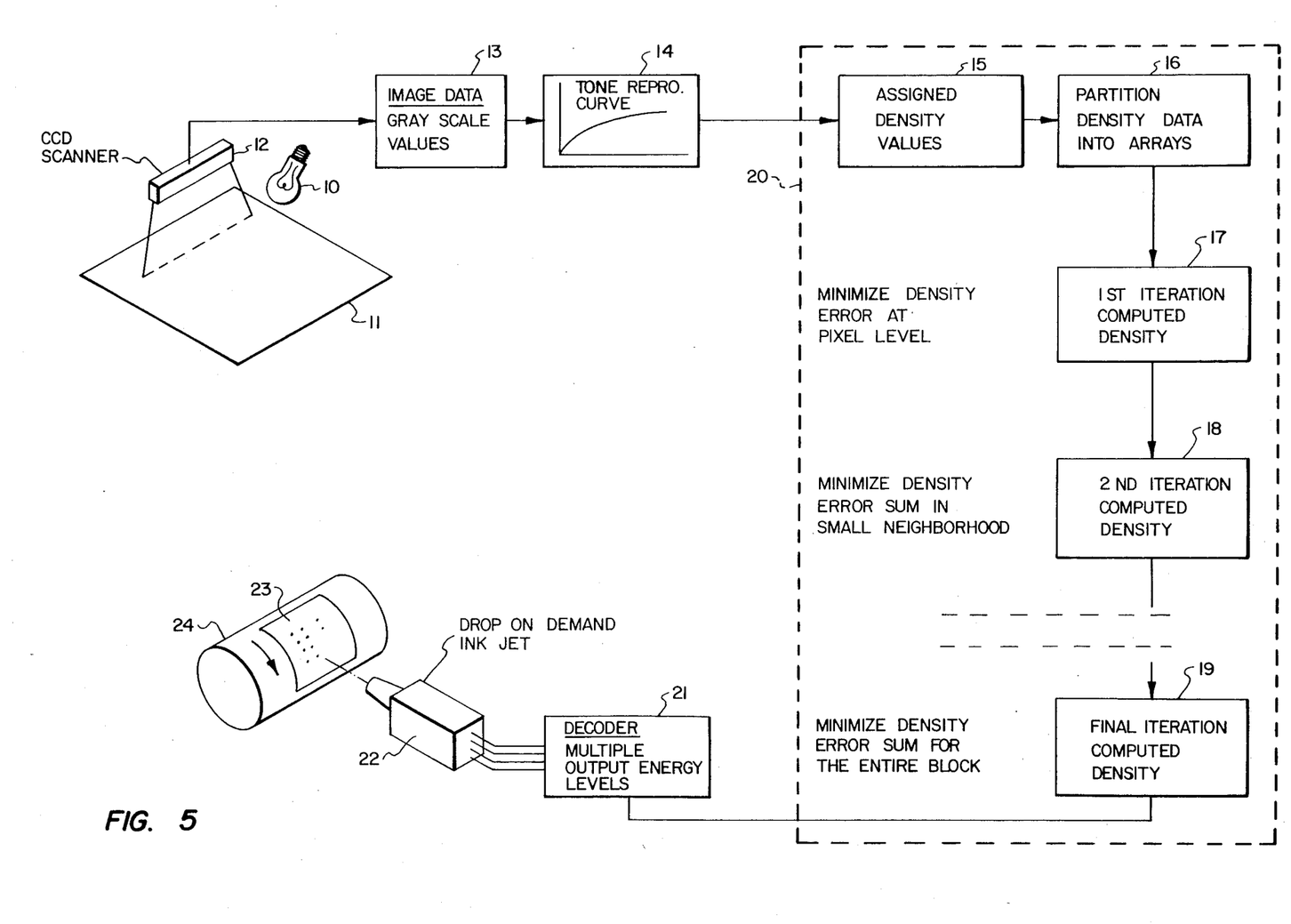
FIG. 5 is a block diagram illustrating the image reproduction system.

FIG. 5 illustrates a reproduction system implementing the image processing algorithm. An image is contained on a medium 11 which is iluminated by a light 10. The image is then input through a CCD scanner 12 resulting in image data of gray scale values. The CCD scanner can be any typical high resolution electronic digitizing camera such as the Data Copy Model 610 or an Eikonixscan 77/99M digital image processing vidicon camera. The output of the CCD scanner 12 is the image data 13. The image 13 is transformed according to a predescribed tone reproduction curve logic function 14 to a set of assigned density values 15 in a processor 20. These assigned density values are then partitioned by the processor into arrays 16. The first iteration of the algorithm computes an error array that attempts to minimize the errors at the pixel level. The arrays are then repartitioned by the processor into subarrays and corresponding error subarrays are computed. The processor using the algorithm then attempts to minimize the density error in the small subarrays in a second iteration 18 as previously described. Then the processor using the algorithm makes a final iteration 19 which minimizes the density error at the total array level. The output of the processor 20 is connected to, for example, a decoder 21 which transforms the print array data into multiple energy levels that are coupled to an ink jet 22 that provides the reproduced image on a medium 23 located upon a roller 24 of the ink jet 22.

It should be noted that the output from the CCD scanner 12 is digital and may be input directly into the processor 20 or stored in a memory such as magnetic tape or magnetic disk for later processing. In the embodiment of FIG. 5, the multiple output energy levels of the ink jet 22 correspond to the fixed gray scale levels that are selected by processor 20 in executing the image processing algorithm. The multiple output energy levels result in different size printed dots on the paper 23. Generally, the achievable range of printed dot sizes are fixed because of the physical limitations of the ink jet apparatus. Furthermore, the minimum number of levels for the system can be 2 i.e. in the case of the binary output printer where the levels of output are either a printed dot or nothing printed. An example of an ink jet apparatus is disclosed in U.S. Pat. No. 3,683,212 entitled "Pulsed Droplet Ejecting System."

Although preferred embodiments of the invention have been described in detail, it should be understood that various changes, alterations, and substitutions may be made therein without departing from the spirit and scope of the invention as defined by the appended claims.

What is claimed is:

1. A method of processing image data wherein each data is to be printed or displayed as a pixel, each pixel programmable to one of a plurality of discrete gray scale values, said method comprising the steps of:
   (a) partitioning said image data into an array;
   (b) computing a print array of print values each being a closest pixel gray scale value of a correspondingly located image datum of the image data array;
   (c) computing an error array of value differences between the print values and the correspondingly located image data;
   (d) adjusting print values in accordance with said gray scale values to reduce sums of error values, each within a plurality of unique error subarrays formed within the error array; and
   (e) outputting the adjusted pixel print values for printing or display.

2. A method according to claim 1 wherein step (d) includes the steps of:

(1) partitioning the image data array, the print array and the error arrays into a plurality of mutually exclusive subarrays;
(2) computing error sums for each subarray;
(3) adjusting the print value of the largest magnitude error value within each subarray to reduce the subarray error sum until no further adjustment will reduce the subarray error sum;
(4) repartitioning the image data array, the print array and the error array into a plurality of next larger size subarrays;
(5) repeating steps (2) and (3); and
(6) repeating steps (4) and (5) until the next size submatrix is the error matrix.

3. A method according to claim 2 wherein each subarrays adjoins at least one other subarray.

4. A method according to claim 3 wherein said next larger size subarrays each include a larger number of data elements that are included in a previously partitioned subarray.

5. A method according to claim 4 wherein at least one of said next larger size subarrays include a larger number of data elements that are included in the remaining next larger size subarrays.

6. A method according to claim 4 wherein each subarray for partitioning step includes an equal number of elements.

7. A method according to claim 6 wherein said image data array is an N column by N row matrix where $N=2^i$ and i is an integer.

8. A method according to claim 7 wherein said error array value differences are computed by subtracting the image data from correspondly located print values.

9. A method according to claim 8 wherein said error subarrays are unique square matrices formed within the error array.

10. A method according to claim 9 wherein step(d) includes iteratively forming submatrices within the error matrix by:
(1) initially forming a plurality of 2 by 2 matrices;
(2) computing the error sum for each submatrix;
(3) adjusting the print value of the largest magnitude error value within each submatrix to reduce the error sum until no further adjustment will reduce the error sum;
(4) forming next size square submatrices within said error matrix;
(5) repeating steps (2) and (3); and
(6) repeating steps (4) and (5) until the next size square submatrix is the error matrix.

11. A method according to claim 1 wherein step (d) includes the steps of:
(1) partitioning the image data array, the print array and the error arrays into a plurality of mutually exclusive subarrays;
(2) computing error sums for each subarray;
(3) adjusting the print value of the largest error value having the same sign as the error sum of the subarray to reduce the subarray error sum magnitude until no further adjustment will reduce the subarray error sum magnitude;
(4) repartitioning the image data array, the print array and the error array into a plurality of next larger size arrays;
(5) repeating steps (2) and (3); and
(6) repeating steps (4) and (5) until the next size submatrix is the error matrix.

12. A method of processing image data including a plurality of data points, each representing a gray scale value of an element area of an image document to be printed or displayed by a device printing or displaying pixels corresponding to said data points, each pixel programmable to one of a plurality of discrete gray scale values, said method comprising the steps of:
(a) partitioning said image data into an N column by N row image data matrix (where $N=2^i$, where i is an integer);
(b) computing a print matrix of print values wherein each print value is the closest pixel gray scale value corresponding to a correspondingly located image value of said image data matrix;
(c) computing an error matrix of error values wherein each error value is computed by subtracting a correspondingly located image value from a correspondingly located print value;
(d) partitioning said error matrix into a first plurality of submatrices of $2^M$ by $2^M$ elements each (where initially $M=1$);
(e) for each submatrix;
(1) computing a first submatrix error sum by adding each of the error values of the submatrix;
(2) determining an altered print value by changing the correspondingly located print value of the largest magnitude submatrix error value to the next discrete gray scale value to reduce the magnitude of this submatrix error value;
(3) computing an altered submatrix error sum by subtracting the correspondingly located image value from the altered print value; and
(4) replacing the point value with the altered point value if the altered submatrix error sum magnitude is less than the first submatrix error sum magnitude;
(5) repeating steps (e) (1) through (e) (4) until the altered submatrix error sum is greater than the first submatrix error sum magnitude;
(f) repartitioning said error matrix into a second plurality of submatrices of $2^M$ by $2^M$ elements each (where $M=M+1$);
(g) repeating step (e);
(h) repeating steps (f) and (g) until $M=i$; and
(i) outputting the $M=i$ data by pixel for printing or display.

13. An image reproduction system comprising:
an image data input means for scanning an original image and providing an array of image input data corresponding to gray scale levels of picture element locations of said original image;
a processing means for receiving said image input array and computing a print array of print values, each print value corresponding to one of a fixed number of gray scale values, said print array representing a minimum total difference between the image input array values and the possible print array values for the fixed number of gray scale values; and
a printing means capable of printing picture elements each having a dot size corresponding to one of the fixed number of gray scale values, for printing a plurality of picture elements, each corresponding to one value of the print array, upon a medium at locations corresponding to the locations of the corresponding image data from the original image for printing a reproduction of the original image.

14. An image reproduction system according to claim 13 wherein said image input data represents a plurality of color data groups representing a plurality of colors of said original image.

15. An image reproduction system according to claim 14 wherein said printing means further combines said plurality of color data group in printing said picture elements for printing said reproduction of said original image in color.

16. An image reproduction system according to claim 13 further including calibration means including a scanner means for scanning said original image reproduction and providing an array of calibration image input data, and comparison means for comparing said array of calibration image input data with said print array.

17. An image reproduction system comprising:
an image data input means for scanning an original image and providing an array of image input data corresponding to gray scale levels of picture element locations of said original image;
a processing means for receiving said image input array and computing a print array of print values, each print value corresponding to one of a fixed number of gray scale values, said print array representing a minimum total difference between the image input array values and the possible print array values for the fixed number of gray scale values; and
a display means capable of displaying picture elements, each having an intensity level corresponding to one of the fixed number of gray scale values, for displaying a plurality of picture elements, each corresponding to one value of the print array, visually at the locations of the corresponding image data from the original image for displaying a reproduction of the original image.

18. An image reproduction system according to claim 17 wherein said image input data represents a plurality of color data groups representing a plurality of colors of said original image.

19. An image reproduction system according to claim 18 wherein said printing means further combines said plurality of color data group in printing said picture elements for printing said reproduction of said original image in color.

20. An image reproduction system comprising:
a processing means for processing data representing an image and computing a print array of print values, each print value corresponding to one of a fixed number of gray scale values, said print array representing a minimum total difference between the image data and the possible print array values for the fixed number of gray scale values and a display means capable of displaying picture elements, each having an intensity level corresponding to one of the fixed number of gray scale values, for displaying a plurality of picture elements, each corresponding to one value of the print array, visually at the locations of the corresponding image data.

21. An image reproduction system according to claim 20 wherein said image input data represents a plurality of color data groups representing a plurality of colors of said original image.

22. An image reproduction system according to claim 21 wherein said printing means further combines said plurality of color data group in printing said picture elements for printing said reproduction of said original image in color.

23. An image reproduction apparatus comprising:
(a) a data image means for producing a gray scale pixel value for each pixel of a data image of a scene, and
(b) a data processing means responsive to the gray scale pixel value for producing a printing dot for each pixel of the image having a size which approximates the gray scale value, whereby a gray scale image having enhanced resolution is producible.

24. An image reproduction apparatus according to claim 23 wherein the data processing means further includes means responsive to the gray-scale pixel value for selectively producing a printing dot signal for each pixel of the image having a discrete halftone for enhancing the gray scale reproductions of the image.

25. An image reproduction apparatus comprising:
(a) a means for producing an image of a scene;
(b) an image data producing means responsive to the image for producing a data image pixel by pixel having gray scale values corresponding to the scene; and
(c) data processing means operatively connected to the image producing means for: (i) comparing the gray scale pixel values of the data image to a set of preselected gray scale values representative of the computers signal producing capability and generating an assigned data image with pixels having assigned gray scale values most closely approximating the data image; (ii) partitioning the assigned data image into a plurality of arrays and subarrays; (iii) performing a pixel error determining cycle including differencing the data image and the assigned data image for producing a pixel error image, combining the pixel errors for each subarray of the error image, generating an error value for each subarray, combining the subarray error values into a composite array error value indicating whether the array is too dark or too light, determining the subarray having the greatest applicable error, the pixel of the subarray having the highest worst case value and the next best value therefor from the set of preselected gray scale values, and substituting the next best value therefor; (iv) repeating the error determining cycle with the substituted value for obtaining a minimized error value for the array; and (v) controlling responsive to the pixel gray scale values as finally determined the size of the printing dot in proportion to the corresponding pixel value.

* * * * *